Oct. 28, 1952 E. T. CHURCHMAN 2,615,362
FASTENING DEVICE
Filed Sept. 5, 1947
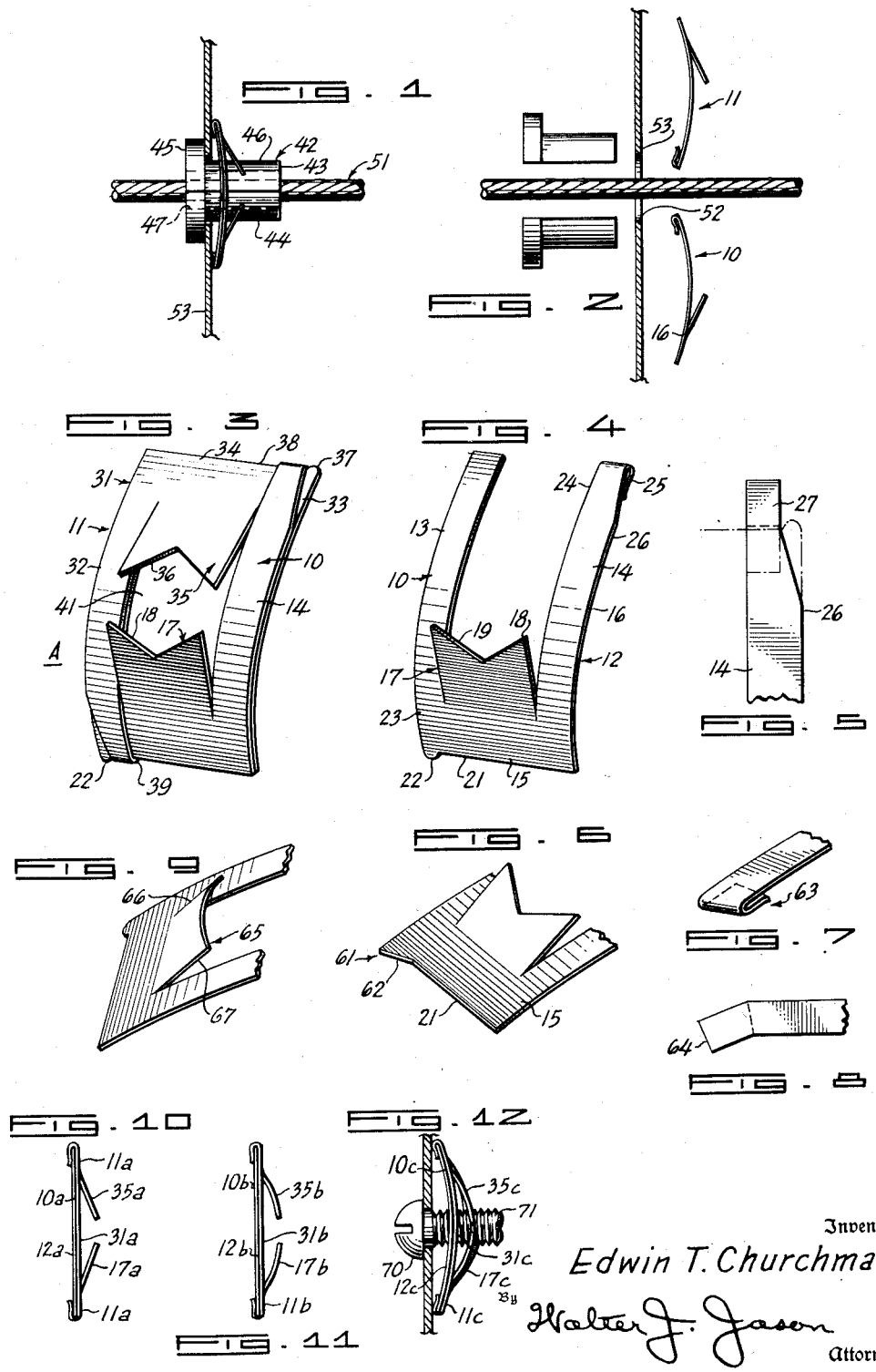
Inventor
Edwin T. Churchman
By Walter J. Jason
Attorney Patented Oct. 28, 1952

2,615,362

UNITED STATES PATENT OFFICE 2,615,362

FASTENING DEVICE

Edwin T. Churchman, San Diego, Calif., assignor to Consolidated Vultee Aircraft Corporation, San Diego, Calif., a corporation of Delaware Application September 5, 1947, Serial No. 772,334

1 Claim. (Cl. 85—36)

This invention relates to fastening devices and more particularly to improved spring type fasteners made of sheet metal adapted to hold an object to be grasped by virtue of their inherent resiliency.

An object of the present invention is to provide an improved form of spring type fastener which may be readily assembled and disassembled on the device to be grasped.

Another object of the invention is the provision of a fastener having an improved construction which adapts it to be applied readily to a device such as a cable or a bolt having a long shank without the necessity of a tedious mounting operation.

Another object of the invention is to provide a spring type fastener having yieldable gripping portions adapted to secure an object under continuous spring tension.

Another object of the invention resides in the provision of a spring-type fastener comprising two separable elements adapted to interlock and be readily assembled on an object to be mounted and mutually cooperating to provide a locking engagement therewith.

A further object of the invention is the provision of an improved spring type fastener which is normally maintained in an applied position by reason of the inherent resiliency of its parts which afford a continuously effective spring pressure to effect a rigid locking engagement with the device supported and which is not subject to ready loosening or displacement therefrom.

A still further object of the invention lies in the provision of an improved form of resilient fastener which is simple in construction, efficient in operation and economical to manufacture.

Other objects and features of the invention will be readily apparent to those skilled in the art from the following specification and appended drawings illustrating certain preferred embodiments of the invention in which:

Figure 1 is a side elevational view of a fastener constructed in accordance with the present invention and shown applied to a device being supported;

Figure 2 is a view illustrating the fastener and the device to be supported preparatory to their being disposed in assembled relationship;

Figure 3 is a perspective view of the spring type fastener per se shown employed in Figure 1;

Figure 4 is a perspective view of one locking element of the spring type fastener illustrated in Figure 3;

Figure 5 illustrates a portion of the locking element of Figure 4 and prior to the formation of a hook or holding flange thereon;

Figure 6 illustrates a modified form of latching lug that may be provided on the locking element of Figure 4;

Figure 7 shows the form of the holding flange which is adapted for use with the latching lug of Figure 6;

Figure 8 illustrates the holding flange of Figure 7 prior to its being formed into the configuration of Figure 7;

Figure 9 illustrates a partial view of a modification of the invention wherein the spring tongue is of different form, and Figures 10, 11 and 12 are side elevational views of fasteners which embody modifications of the present invention.

Having particular reference now to the drawings, Figures 1 to 5 inclusive illustrate a preferred form of fastener A comprising two separable cooperating locking elements 10 and 11. Each of the locking elements 10 and 11 are identically formed but in assembled relationship are, as shown, reversely positioned. Locking element 10 comprises a readily flexible base 12 formed of sheet-metal and having a generally U-shaped configuration. Base 12 comprises a pair of transversely spaced, longitudinally extending portions or leg members 13 and 14 joined at one of their ends by end portion 15. The base 12 is arched in a longitudinal direction so as to effect a concave bottom surface 16. The base 12, at the end portion 15 is partially sheared, as shown, and upstruck or upwardly inclined to provide a spring tongue or prong 17 located on base 12 intermediate leg members 13 and 14. It is noted that while base 12 is longitudinally arched the upstruck spring tongue 17 is flat with the surface thereof disposed in a common plane which is inclined to base 12. Integral spring tongue 17 terminates in an indented or recessed end 18, providing an inwardly opening seat 19 adapted to frictionally engage with a device to be supported.

Outwardly projecting from the bottom edge 21 of end portion 15 is a rounded lug, ear or extension 22. One side of the lug 22, as shown, merges into the longitudinal edge 23 of leg member 13. The opposite leg member 14 has formed at its outer, or free, extremity 24 a return bent flange 25 which effects a hook or latching means. As is best seen from Figure 5 the leg 14 at its end 24 is inwardly cut from longitudinal edge 26 to provide a necked-down portion 27, which portion 27 is downwardly and return bent to effect the flange 25 disposed on that side of base 12 which is opposite to the side at which the tongue 17 is disposed. It is noted that no such flange 25 is provided at the end of the opposite leg member 13. Rather than being downwardly bent it is understood that flange 25 could be bent in the reverse direction, upwardly, and return bent to form a hook.

Locking element 11 which cooperates with locking element 10 to effect the fastener A is identical in appearance and construction to locking element 10 just described. Locking element 11 therefore comprises a generally U-shaped base 31, longitudinally arched or bowed, and having two spaced leg members 32 and 33, joined by an end portion 34, and with a flat spring tongue 35 upstruck from the base 31, which spring tongue is provided at its free end with an inwardly opening seat 36. A projecting, rounded ear or lug 37 extends from edge 38 of end portion 34 and a return-bent flange 39 is formed upon the end of leg member 32 to provide a hook. It is noted from the above description that in all respects, locking element 11 resembles locking element 10.

Locking elements 10 and 11 are adapted to be assembled, in interlocking engagement, one upon the other and with their leg members interlaced to effect an operable fastening unit A. In assembled relationship the elements will be located and positioned as illustrated in Figure 3. It is seen that when elements 10 and 11 are assembled, the yieldable spring tongues 17 and 35 will be disposed opposite one another and with their indentations or seats 18 and 36 oppositely directed. The leg members 32 and 13 are disposed in contiguous relation to one another, with the leg member 32 lying upon or being mounted over leg member 13. Leg members 33 and 14 are likewise disposed contiguous to one another, but here leg 14 lies upon or over leg 33. Hook 39 carried by leg member 32 of locking element 11 will be engaged with the end portion 15 of locking element 10, passing from front to rear thereof, over and around the edge 21 thereof. Hook 25 carried by leg member 14 of locking element 10 will latch or fasten to the end portion 34 of element 11, passing from front to rear thereof. Ear 22 provided by element 10 cooperates with hook 39 and ear 37 on element 11 cooperates with hook 25 to prevent these hooks inadvertently sliding out of fastening engagement, these various cooperating elements serve also to properly locate the locking elements 10 and 11 one with respect to the other.

As shown in Figure 3, recessed tongues 17 and 35 when disposed in assembled relationship present a generally diamond-shaped opening 41 therebetween, through which opening the element or device to be supported extends. Figure 1 illustrates the fastener A in operative assembled position. The fastener A here is being utilized to maintain a grommet 42 in position. The grommet 42 is comprised of two parts 43 and 44, identical in appearance. Placing halves 43 and 44 together effects a grommet having an enlarged annular head 45 from which extends a cylindrical shank 46, and with an axial bore 47 passing the length of the grommet.

Grommet 42 is provided to serve as a fairlead for a cable 51 which is required to pass through an opening 52 in a wall 53. The grommet halves 43 and 44 will be disposed about cable 51 with the shank 46 mounted in opening 52 and with the annular head 45 bearing against one side of wall 53. On the opposite side of wall 53 the fastener A will be assembled about cable 51 and will be applied to grommet shank 46, being pushed thereon over the end thereof, with one locking element fitting from above the shank and the other locking element from below. Hooks 25 and 39 will fasten the two elements 10 and 11 together. The spring tongues 17 and 35 will be disposed in frictional locking engagement with shank 46. Since the spring tongues 17 and 35 are relatively yieldable the fastener A is adapted for sliding movement, in one direction, on shank 46. Therefore, after the locking elements 10 and 11 are assembled on cable 51 and when fastened to one another by means of their integral hooks 25 and 39 they can be readily moved into fastening position on the shank 46 by an axial thrust in the direction of the wall 53, to carry the outer ends of the concave or bowed fastener A into engagement with wall 53. With concave fastener A in engagement with wall 53 continued axial pressure thereon will cause the locking elements 10 and 11 to change their condition from a normally untensioned state to a tensioned one wherein the oppositely placed end portions 15 and 34 of locking elements 10 and 11 will move upon wall 53 away from one another to elongate the bowed fastener. In seeking to assume their initial concave position force will be transmitted by stressed elements 10 and 11 to tongues 17 and 35 to urge the notched ends thereof inwardly toward each other to wedge into the shank 46 of grommet 42 to thereby hold the two halves 43 and 44 thereof in close assembly. The spring tension supplied to shank 46 through spring tongues 17 and 35 will, it is noted, be axially applied thereto which axial pressure continually acts to tend to move the shank 46 away from wall 53 to draw and hold annular head 45 into snug engagement with the wall 53. The tongues 17 and 35 exert a continuously effective spring holding action which is adapted to properly position and maintain the grommet in secured condition and prevents it becoming loose or falling off if subjected to extreme conditions of strain, jarring or vibration when in use.

The present invention by reason of its improved construction and by being formed of two parts adapts it to use wherever it is necessary to clamp an item to a cable, as in the case of the grommet 42, above described. This invention permits the cable to be in strung position at the time of mounting a device thereon. It is not necessary to cut the cable down and string the fastener over an end thereof. It has been the practice in the past when mounting control cables to thread on the required number of clips, fasteners and other items to be carried thereby, in proper sequence before the cable ends are secured. With this old type of construction it is obvious that whenever it became necessary to remove a fastener because it was defective or to change fasteners for any reason, such removal could not be effected without cutting the fastener off or dismounting the cable.

In the present invention a fastener has been provided which is readily applied to and removable from a cable, conduit, or tube and without in any way disturbing the mounting of such cable, conduit or tube. Further if the fastener should become loose on a control cable the two parts constituting it will separate and fall off such cable thereby preventing possible fouling of such cables at the pulleys or guides.

It is intended that the fastener A be utilized with studs, bolts or screws of elongated length. The two locking elements 10 and 11 will first be assembled and the opening 41 defined by the oppositely disposed tongues 17 and 35 will be fitted over the end of a stud or bolt and with an axial thrust the fastener A is pushed down the length of the stud shank to the position where the spring tongues 17 and 35 are made to bear against such shank and apply a grasping force thereto. The fastener A is therefore readily applied to bolts and screws having long shank portions for they can be pushed to mounting position rather than slowly threaded the length of the shank.

Figure 6 illustrates a changed form of lug or ear that may be used with the invention. As shown, the changed lug or ear 61 extends from the bottom edge 21 of the end portion 15 and is in effect an angle notch provided with a straight surface 62. The particular configurations of lug 22 of the preferred embodiment and the lug 61 are only illustrative of lugs that may be employed.

Figures 7 and 8 show a different form of hook or locking flange 63 that may be provided on leg members 14 and 32 for connecting the two elements 10 and 11 together. Hook 63 comprises forming the end 64 of a leg member with a compound bend with the first bend being made transversely away from the longitudinal edge of the leg member as shown in Figure 8. The second bend will be made by rearwardly directing the end 64 upon itself to complete the hook 63. The hook 25 of the preferred embodiment and the hook 63 are understood to be illustrative only of the type of hooks usable by the invention.

Figure 9 illustrates an embodiment of a spring tongue 65 having a different form than the spring tongues utilized in the preferred modification of Figures 1 through 5. Spring tongue 65 is substantially arcuate along its length, being formed by being inwardly pinched at its extremity to carry the lateral edges 66 and 67 thereof toward each other. Spring tongue 65 will function in similar manner to the spring tongues 17 and 35 of the preferred embodiment.

Figures 10, 11 and 12 are modifications of the invention. The modification of Figure 10, as in the preferred embodiment, comprises two interlocking members indicated at 10a and 11a. The distinction in this embodiment over the preferred lies in the provision of flat base portions 12a and 31a, whereas, as was pointed out in the description of the preferred embodiment, the base portions 12 and 31 thereof were longitudinally arched. Thus in the present modification the base portions 12a and 31a and the yieldable spring tongues 17a and 35a upstruck therefrom are flat. The shank of an article to be grasped, such as a grommet or a bolt, will be passed between the ends of yieldable tongues 17a and 35a and will be locked in place by the inherent resiliency thereof. The distance between the ends of the cooperating tongues at the shank engaging portions is less than the diameter of the shank to be grasped and a wedge-like action at the point of contact will be secured which will hold the article being mounted against loosening under vibration.

Figure 11 illustrates a modification which is similar in all respects to the preferred embodiment, differing therefrom only in the manner of formation of the base portions and the cooperating spring tongues struck therefrom. This modification comprises two separable locking elements 10b and 11b which, similarly to the modification of Figure 10, comprise flat base portions 12b and 31b, but from which flat base portions extend yieldable tongue members 17b and 35b which are arched or bowed along their length. Again the device to be secured will be mounted by pushing the fastener thereonto with the yieldable spring tongues 17b and 35b wedging against the shank of the device and holding it in position under the force provided by the inherent resiliency thereof.

Figure 12 provides a modification comprising two separable locking elements 10c and 11c which have bowed or longitudinally arched base portions 12c and 31c from which are struck and inclined upwardly the oppositely disposed yieldable tongues 17c and 35c, which are also bowed or longitudinally arched, and as in the preferred embodiment, terminating in inwardly opening seats. Differing from the preferred embodiment each of the tongues 17c and 35c are twisted or warped to provide a helical shape of a thread to be held. A threaded bolt 70 is shown with its shank 71 extending between the spring tongues 17c and 35c. The bowed base portions 12c and 31c when in stressed operative position on a mounting surface will provide a force to the spring tongues 17c and 35c which adds to the tension provided by such tongues, by reason of their inherent resiliency, to very securely hold the bolt 70 in mounted position. It is understood that though tongues 17c and 35c have been formed preferably for use with threaded bolts or screws yet such tongues are adapted to hold articles such as the grommet 42 or other smooth shanked devices.

While certain preferred embodiments of the invention have been specifically disclosed, it is understood that the invention is not limited thereto, as many variations will be readily apparent to those skilled in the art and the invention is to be given its broadest possible interpretation within the terms of the following claim.

I claim:

A fastener comprising a pair of substantially duplicate unitary sheet metal separable locking members having portions thereof, adapted to be connected to one another in superposed relation to effect an operative assembly, each of said locking elements comprising a base portion having an end portion, longitudinally extending spaced leg members integral with said end portion, and an integral longitudinally extending tongue element extending from said end portion in the space between said leg members, and fixed latching means provided on the free end portion of one leg member of each locking element for readily detachably connecting said locking elements to one another, said tongue elements provided by said locking elements being oppositely disposed and spaced from one another when said locking elements are in connected assembly, and adapted to engage and hold, under spring force, a member to be secured, passed therebetween.

EDWIN T. CHURCHMAN.

REFERENCES CITED

The following references are of record in the file of this patent:

UNITED STATES PATENTS

| Number | Name | Date |
| --- | --- | --- |
| 370,168 | Truxal | Sept. 20, 1887 |
| 394,462 | Cook | Dec. 11, 1888 |
| 885,052 | Jensen | Apr. 21, 1908 |
| 1,652,272 | Dawson | Dec. 13, 1927 |
| 1,976,638 | Smith | Oct. 9, 1934 |
| 2,192,165 | Caldwell | Feb. 27, 1940 |
| 2,234,097 | Tinnerman | Mar. 4, 1941 |
| 2,365,785 | Tinnerman | Dec. 26, 1944 |